INVENTOR.
TRUMAN G. BERGMAN
ATTORNEY.

Nov. 12, 1968     T. G. BERGMAN     3,410,641

LASER RANGE FINDER DEVICE

Filed June 25, 1965     2 Sheets-Sheet 2

*INVENTOR.*
TRUMAN G. BERGMAN
BY
*P.H. Fisht*
ATTORNEY.

United States Patent Office 3,410,641
Patented Nov. 12, 1968

3,410,641
LASER RANGE FINDER DEVICE
Truman G. Bergman, China Lake, Calif., assignor to the United States of America as represented by the Secretary of the Navy
Filed June 25, 1965, Ser. No. 467,151
5 Claims. (Cl. 356—5)

The invention described herein may be manufactured and used by or for the Government of the United States of America for governmental purposes without the payment of any royalties thereon or therefor.

The present invention relates generally to a distance measuring system and more particularly to a lightweight laser system for use in range finders of the type which utilize reflected laser emission for purposes of determining range, i.e., observer-to-target distance.

At present, numerous range finding devices exist for determining observer-to-target distances. However, these devices fail to fulfill existing needs. For example, it is well-known that within the armed services there exists a need for a simple, lightweight device of a type which may be adapted for "sniping" purposes.

A sniper's mission often requires a single long range rifle shot. It is important that this shot be accurate, since an opportunity for a second shot normally will not be available. At great distances, for example, 1,000 yards, the inability to accurately determine range often leads to mission failure.

Various attempts have been made to provide means for aiding the sniper in determining range. Such attempts include the use of conventional radar techniques. However, power requirements and "ground clutter" tend to render such systems impractical for situations normally encountered by the rifleman. It has been found that systems which employ laser light have a greater potential than radar systems in fulfilling needs existing in the range finder field. A laser range finder has many advantages over the conventional radar. For example, laser light is nearly monochromatic, so that background radiation may be readily filtered; the emission from a laser can be collimated into a very narrow beam, so that extraneous reflection or "scatter" may be maintained at a satisfactory level; and the power required for driving a laser range finder is significantly less than that required for driving a comparable radar system.

However, presently existing laser range finding systems have not met all of the requirements imposed by normal field conditions. This is due, in part, to the fact that known laser systems are bulky, heavy and normally require at least three distinct optical systems for performing separate tasks, i.e., aiming the range finder; decreasing projected energy divergence; and collecting reflected energy.

It is therefore the purpose of the present invention to overcome the aforementioned disadvantages by providing a practical, compact, simple, and lightweight system for use in range finders of the type which provide distance data as a function of the time required in obtaining target-reflection of laser emission. This is achieved, generally speaking, by providing a simple rugged system for achieving Q-spoiling of a laser resonating cavity, i.e., obtaining pulsed laser emissions from a regenerative laser rod, and combining therewith a simple optical system which is provided with a single synthesized optical train and a compact, simple, efficient, and rugged detector system, which includes the gain control characteristics required under practical operative conditions.

An object of the present invention is to provide a simple laser system wherein a laser pulse is caused to be emitted by Q-spoiling a regenerative laser and projected, from a rotating Q-spoiler, toward a target and returned to the Q-spoiler through a single optical train and then detected with distance data being presented as a function of the angular displacement imparted to the rotating Q-spoiler.

Another object is to provide a simple synthesized optical system for use in a laser range finding system.

A further object is to provide a simple lightweight, compact and efficient detector system for use in a laser range finder, which includes gain control means for obviating high-energy "back-scatter."

Other objects, advantages and novel features of the invention will become apparent from the following detailed description of the invention when considered in conjunction with the accompanying drawings wherein:

FIG. 1 comprises an over-all schematic view of the system of the instant invention;

FIGS. 2A and 2B comprise a top and a side schematic view, respectively, on an enlarged scale, of the system of FIG. 1, illustrating the paths of the laser emissions through the system;

Figure 4:
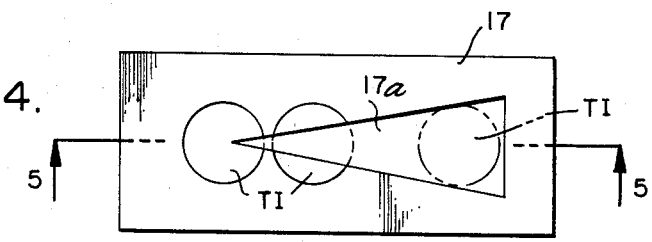
FIG. 4 is a plan view on an enlarged scale, of the field stop shown in FIGS. 1 and 2B, illustrating three randomly selected points at which a target, at given instances, may be imaged thereon for purposes of providing gain control.
Figure 5:
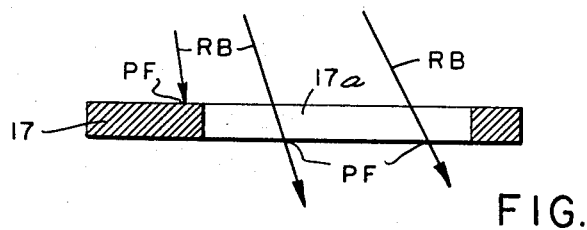
Figure 6:
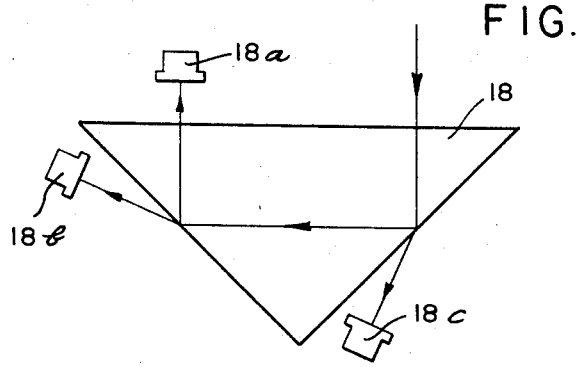

FIG. 5 comprises a diagrammatic view illustrating successive points at which the target may be imaged on the field stop of FIG. 4 during successive portions of a single revolution of the Q-spoiler; and FIG. 6 is a schematic view of a detector system which may be employed by the instant invention.

Figure 1:
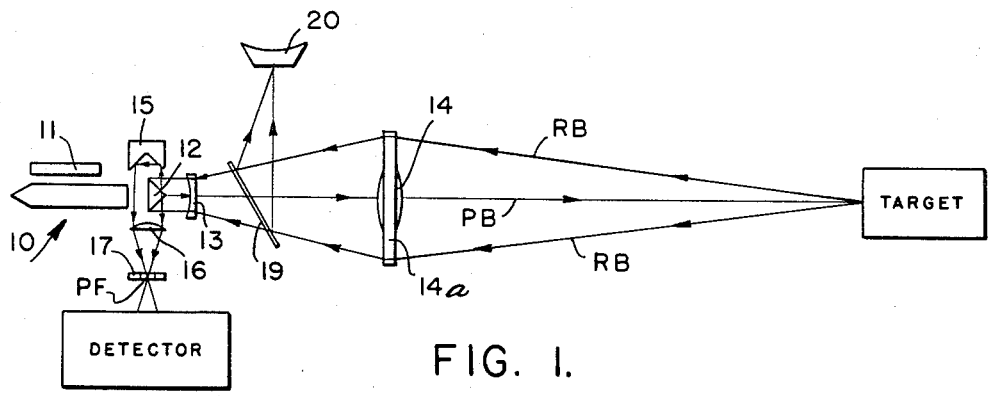

Referring now to the drawings, wherein like reference characters designate like or corresponding parts throughout the several views, there is shown in FIG. 1 an over-all schematic view of the system of the instant invention, including a regenerative laser rod, generally designated 10, and a conventional flash-lamp 11 closely associated therewith in a well-known manner. The rod 10 includes a first end 10a, conforming to an internally reflecting rooftop prism, FIGS. 2A and 2B, and a second end 10b conforming to a plane transverse surface or interface.

It has been found that where right-angle prisms are used at the ends of laser resonating cavities, the prisms may be employed as output ends by truncating or establishing a transversely aligned flat along the apex thereof. The flat will then emit in a line, although it might not normally be expected to do so. However, due to relatively recent discoveries, it has been found that a standing wave may be sustained in the region of truncation, although the reasons therefor are not yet fully understood. A probable explanation for the lasing action, or energy emisison, is to ascribe this effect to off-axis modes of resonance. Another proposed explanation is that lasing action results as a consequence of the optical inhomogeneities of the laser rod itself which causes laser radiation to scatter into the resonating region.

It has also been discovered that a truncated right-angle internally reflecting prism may be severed and retained in coaxial alignment with the rod to establish a pair of parallel interfaces between the end of the rod and the base of the prism without destroying the prism's functions. Consequently, as has been determined through experimentation, this severed prism may be rotated to effect Q-spoiling of the associated cavity. This is achieved by rotating the prism about an axis, as indicated by the arrow A, FIGS. 2A and 3, for aligning the interface 10b, located at the end of the rod 10, and the base 12b of the prism 12 for thus causing them to become arranged in a face-to-face relationship once during each revolution of the prism. As the interfaces are caused to become aligned, a large pulse of laser energy is emitted in a line from the flat. Therefore, the severed prism may be utilized as a Q-spoiler by imparting unidirectional rotation thereto for obtaining a beam of pulsed laser light.

Figure 2A:
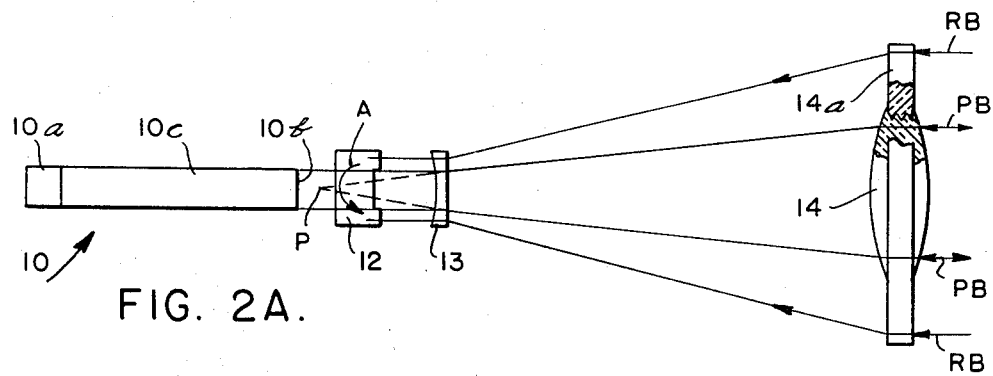
Figure 2B:
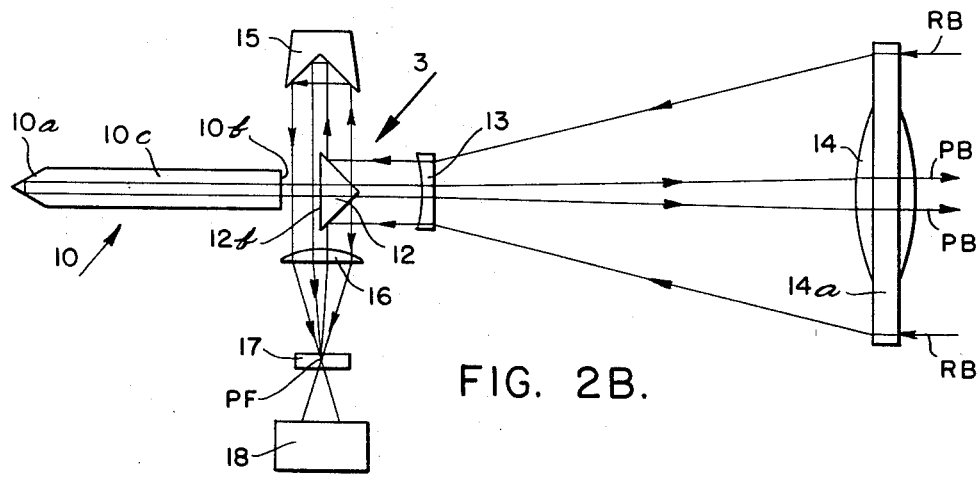
Figure 3:
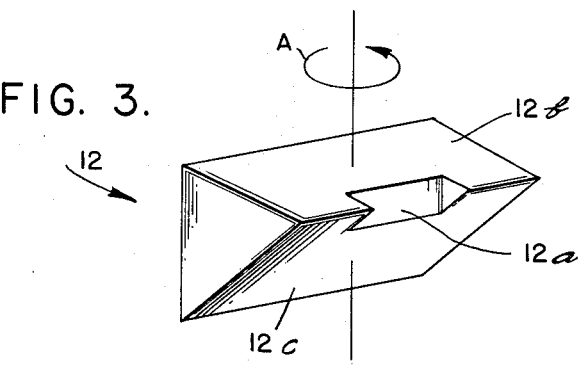
FIG. 3 is an enlarged perspective view, taken generally at 3 in FIG. 2B, of the Q-spoiler employed for obtaining emission from the laser rod and for reflecting target reflected laser emission to the detection system at varying angles of incidence.

As more clearly illustrated in FIGS. 2A, 2B and 3 the Q-spoiler of the present invention comprises an aligned and rotatably mounted internally reflecting right-angle prism 12 having a flat 12a polished along the apex thereof. This flat is formed in parallel alignment with the base of the prism. Any suitable means may be employed for mounting and rotating the prism 12, at a preselected rate, in a manner such that the base may be alternately aligned with the end 10a of the rod 10 for thus periodically establishing a laser resonating cavity 10c between the rod end 10a and the reflecting surfaces of the prism 12. It will of course be appreciated that the laser rod 10 and the Q-spoiler 12 are to be formed of compatible materials so that light of preselected wavelengths will be emitted. In its practical effect, the rotatable Q-spoiler 12 may be assumed to define one end of the cavity 10c, as well as comprise required means for effecting preselected periodic lasing therefor.

As the Q-spoiler 12 is rotated a series of laser emissions or a pulsed beam of laser energy or light will be emitted from the flat 12a. However, it is desirable to spread and then collimate the beam to minimize spherical aberrations, since the source is monochromatic and axial, and possesses no aberrations other than spherical. Therefore, the laser light may be focused by a beam spreader 13, having an output divergence for producing either a real or a virtual image. The beam spreader 13 comprises a lens having a nearly plano-convex or plano-concave configuration. For the sake of compactness, a plano-concave or negative lens is deemed desirable. The ratio of the radii of the curvature of the beam spreader or plano-concave lens should be 6:1, i.e., the relationship that the radius of curvature of the lens surface facing the Q-spoiler bears to the projecting lens surface. However, through the use of ray-trace data, it has been found that plano-concave radii approximates this ratio closely enough.

The effect achieved through the use of the beam spreader 13 is to spread the beam as it is projected from the rod and thereby effect a removal of spherical aberrations. Therefore, it becomes necessary to collimate the divergent output of the beam spreader 13 in order to project a collimated beam toward the target. In order to achieve collimation, a high-quality objective lens 14 is provided to intercept the divergent output and project a collimated beam toward the target.

The objective lens 14 is adjusted along the optical axis of the beam spreader 13 in a manner such as to locate the focus of the objective lens 14 at the virtual focus point P, FIG. 2A, of the beam spreader 13. Consequently, it is possible to project the beam from the objective lens with collimation of a higher order than the original collimation, by a factor corresponding to the ratio which the diameter of the objective lens bears to the diameter of the laser rod 10.

For purposes of illustration, the path of the projected beam is designated by arrows PB in FIGS. 1, 2A and 2B. This path is followed by the laser emission to the target, with the spherical aberration being substantially removed as a consequence of the beam spreading effect of the lens 13. Hence, "back-scatter," or random reflection from objects outside the path of the emission, as collimated by lens 14, is substantially eliminated.

Since range finders or systems in which the instant invention is to be employed provide distance data based on the period of lapsed time required for the laser light to be reflected by the target, i.e., to travel to the target and return to the range finder, means must be provided for collecting the reflected light upon its return. The optical system employed in the present invention solves this problem in a unique manner, in that the train utilized for projecting the laser emission is also utilized for collecting the emission as it is reflected back to the range finder from the target.

As more clearly shown in FIGS. 2A and 2B, the objective lens 14, which is a high-quality lens for minimizing aberrations, is threaded into an annulus or lens 14a, which for the sake of economy may be a low-quality lens, and then adjusted until their foci match. The light beam returning from the target will be directed back through the lens 14 and 14a, along a return path, indicated by arrows RB, and thence through the lens 13, which serve to collimate the beam, to impinge on the exterior side surfaces 12b and 12c of the prism or Q-spoiler 12. A low-quality lens may be used in collecting the returned laser light since aberrations will, as a practical matter, be of insignificant importance as the light returns from the target. Since the reflected light beam is caused to return through the lens 14a, as well as the lens 14, and is collimated by lens 13, the area of truncation for the prism 12, or flat 12a, will occupy only a fractional portion of the cross section of the returning beam. Consequently, the target is caused to impinge on the exterior side surfaces 12b and 12c of the right-angle prism or Q-spoiler 12, and at either side of the flat 12a. This results in a splitting of the returning beam into separate portions. The surfaces 12b and 12c act as reflecting surfaces and cause the portions of the returning light to be projected along divergent paths, as illustrated in FIGS. 1 and 2B.

Due to the fact that the returning beam is split into two projected portions, it becomes necessary to combine these portions for achieving maximum effectiveness. This is accomplished through a right-angle mirror system 15, of conventional design, which folds the path of one portion and directs the reflected light along a path parallel to the path followed by the first portion to be focused therewith by means of a suitable lens 16. The two portions are focused at a point of focus PF displaced from the lens 16. Near the point PF there is disposed a field stop 17 which intercepts the focused beam, as it is focused by the lens 16, so that a target image TI may be imaged thereon.

It will be appreciated that as the Q-spoiler 12 rotates, the angle of incidence at which the returning beam RB is caused to strike the mirror system 15 and lens 16 will be caused to undergo a constant change, due to the angular displacement of the Q-spoiler 12. This change in the angle of incidence causes the focused beam to "sweep" or be laterally displaced across the field stop 17, as illustrated in FIG. 5. Since the reflected beam is projected and reflected as a series of pulses, the target will be imaged on the field stop at a position dictated by the magnitude of angular displacement imparted to the Q-spoiler. This displacement occurs during the period of time which elapses between the occurrence of lasing and the return of the pulse from the target through the lens 16.

Hence it is to be understood that since the laser beam travels at the speed of light, the position of the target image on the field stop 17 is a function of the angular rate imparted to the Q-spoiler and the distance to the target. Therefore the Q-spoiler may be rotated at a fixed rate so that the distance to the target may be provided as a function of the position of the target image TI as the beam is caused to sweep thereacross.

The field stop 17 is provided with a slot or opening 17a, FIG. 4, through which the reflected light is projected by the lens 16 as the target image TI is imaged on the field stop 17. The quantity of energy passed by the slot 17a is at a maximum value when the pulse is returned from the target. Hence, a detector 18, which is capable of detecting position of impinging light is disposed adjacent to slot 17a to receive the reflected light passed therethrough, and is so aligned with respect to the slot as to provide an indication of the position of the target image TI as it is imaged on the field stop 17a.

While various means may be provided to function as a detector, it has been found that a device such as a photoelectric angle sensor, similar to a device sold under the trade name of Refractosyn, may be satisfactorily employed.

This system may employ three photocells 18a, 18b and 18c aligned at opposite sides of a right-angle optical prism with one side thereof being mounted to face the opening. Hence, when light is caused to strike the prism 18, as it passes through the opening 17a, the location of the area of impingement will be detected and indicated by the magnitude of the output from the photocells 18a, 18b and 18c, and dictated by the incoming angle of the beam. This technique for determining position of light impingement is well within the skill of the art. Therefore, a detailed description thereof is deemed unnecessary for purposes of understanding the instant invention.

It will be appreciated that the magnitude of the energy of any existing "back scatter" will be greatest at close range. This results from the fact that as a practical matter there will be some reflection of the laser energy from objects other than the target, e.g., dust and air molecules, as the pulse is projected. Furthermore, at very close range there may be a tendency for the energy of a reflected pulse to saturate the detector, while there will be an inherent attenuation of the projected emission when the target is located at a significant range. Therefore, means must be provided for significantly reducing the effect of "back scatter" and obviating detector saturation in order for the detector 18 to function efficiently in providing range data for a distantly located target. In practice, this may be achieved by shaping the opening 17a to conform generally to a trainagular configuration with an apex thereof being positioned in the path of the beam as it is projected by the lens 16 and caused to sweep across the field stop 17, as the Q-spoiler 12 is caused to rotate. The apex of the opening 17a is therefore positioned, relative to the lens 16, so as to accept reflected light at a preselected minimum range, i.e., the beam must approach the apex for a preselected period of time as it is caused to sweep across the field stop 17. This arrangement will effectively block light reflected from objects located at less than the preselected range, as illustrated in FIG. 4. However, as the target image TI is imaged at the apex only a portion of light reflected from a target, located at a minimum range, will be permitted to pass through the slot 17a near the apex thereof. This provides a technique for eliminating background noise resulting from background illumination, since only a segment of the target image is passed by the slot. The energy level of the reflected light will be higher at closer ranges, and will diminish as the range increases due to energy attenuation, as well as an apparent reduction in target size. Therefore, the segment of the target image TI passed by the slot 17a must be increased, as the distance increases to a selected maximum range, in order for the detector to respond to the target-reflected light. In other words, when the energy level of the returning laser emission is at a maximum value, the cross sectional area of the beam of light passed by slot 17a may be minimized so that only a small portion of the target need be imaged on the detector. However, when the energy level of the returning light is at a minimum level, the cross sectional area of the beam projected by the lens 16 must be at a maximum value in order for the detector to function. Therefore, by utilizing a slot of a triangular configuration, the required cross sectional area of the beam may be provided for the detector in a simple but satisfactory manner.

If desired, in order to aim the laser system, a dichroic mirror 19, FIG. 1, may be interposed within the path of the returning beams RB for folding the path of a portion of the light focused by the lens 14 and projecting the light to a suitable eyepiece or optical lens 20 so that the target may be viewed by an ovserver through the lens 14.

In operation, the system in an activated condition is directed toward a selected target with the Q-spoiler 12 being rotated at a preselected rate to provide a pulse of laser emission. This pulse is then spread by the beam spreader 13, for thereby causing spherical aberrations to be eliminated and then collimated by the objective lens 14. The collimated pulse is directed to the selected target, the surfaces of which act as reflecting surfaces for reversing the direction of the path of the pulse. As the pulse is thus caused to return to the system, it is collected by the lens 14 and 14a and imaged on the side surfaces of the rotating prism or Q-spoiler 12. The sides of the prism 12 then function to split and project the returned emission in generally opposite directions. A right-angle mirror system folds the path of one portion of the emission and directs it along a path parallel the path taken by the other portion. The two portions are caused to impinge on a focusing lens 16 at varying angles of incidence as the prism 12 continues to rotate. The lens 16 focuses the returned light in a sweeping focus point PF and causes the target to be imaged on the slotted field stop 17 in a manner such that a predetermined portion of the target image TI is caused to pass through the slot 17a and therefore impinge on the surface of the prism 18. The position of the area of impinging light is detected by photocells 18a, 18b and 18c which provide an electrical output indicative of this position. This detected position serves to indicate the extent of angular displacement imparted to the prism 12 between the time of lasing or pulse emission and the time of return of the pulse, as it is reflected by the target. This displacement may be correlated to time and compared to the time required for obtaining a target reflection of the pulse of laser emission. Since the speed of light is constant, the distance to the target may be thus computed. It is feasible to utilize the rotational displacement of the prism to provide a direct read-out for distance data, particularly since the rate of rotation for the Q-spoiler may be made a constant.

While as aforedescribed, the surfaces of the prism 12 may be employed for reflecting the emission returning from the target, it will be appreciated that high-quality mirrors may be associated with the prism and rotated therewith in order to increase the efficiency of the system, where an efficiency increase is required.

In view of the foregoing, it will be appreciated that the present invention provides a simple compact and economic laser system which may be readily adapted for use in distance measuring devices.

Obviously many modifications and variations of the present invention are possible in the light of the above teachings. it is therefore to be understood that within the scope of the appended claims the invention may be practiced otherwise than as specifically described.

What is claimed is:

1. In a system for use in obtaining range-to-target data means comprising, in combination:
- a regenerative laser rod including a first rod end conforming to an internally reflecting roof-top prism configuration and a second rod end conforming to a transverse plane surface configuration, forming a resonating cavity aligned therebetween;
- laser pumping means disposed adjacent said rod for initiating a regenerative function for said rod;
- a rotatable Q-spoiler disposed adjacent said polished second end of said rod comprising an outwardly directed, coaxially aligned right-angle prism including a plane surfaced base and intersecting side surface forming an apex;
- means defining along the apex a polished flat aligned in parallel relationship with said base; means for rotating said Q-spoiler about an axis of rotation so disposed as to cause the flat and base of said right-angle prism to be brought into parallel alignment with the second end of said rod during each revolution thereof, whereby lasing may be achieved for projecting a plurality of laser beams from said flat once during each rotation of said Q-spoiler;

a laser beam spreader including a negative, plano-concave lens disposed adjacent said right-angle prism in the path of beams projected from said Q-spoiler and having a point of virtual focus aligned between the plane surfaces and said Q-spoiler and being so aligned as to cause said beams to diverge as they are projected toward a selected target;

an objective lens disposed between said beam spreader and the target having a point of focus in common with said beam spreader including a central portion for collecting the diverging beams and project collimated beams toward said target, and further including a peripheral portion for collecting the beams as they are reflected from said target and direct the reflected beams through said beam spreader to impinge on said Q-spoiler for thus causing the target-reflected beams to be reflected from the external plane surfaces of the Q-spoiler as the Q-spoiler is caused to be rotated;

a slotted field stop for passing selected portions of images formed thereon;

a collecting lens system including means for collecting the reflected laser beams as the beams are reflected from the external plane surfaces of said Q-spoiler and further including means for focusing the collected beams on said slotted field stop for forming a target image thereon; and a detector system disposed adjacent said field stop including a receiving surface for receiving the focused beams as they are focused on and passed through said slotted field stop and further including means for indicating the position of the beams relative to the receiving surface as the beams are received thereby.

2. In a laser range finder system, means comprising in combination:

an energized regenerative laser rod;

a unidirectionally rotating Q-spoiler having external light reflecting surfaces arranged adjacent one end of said rod in coaxial alignment therewith including means for initiating laser emission during a fractional portion of each revolution thereof and further including external surfaces for reflecting incident emission as it is caused to impinge thereon;

an emission spreader including a negative plano-concave lens for spreading said laser emission;

an objective lens disposed adjacent said negative lens including a central portion for collimating said laser emission and projecting said emission toward a selected target to be reflected therefrom, and further including a perpheral portion for directing the emission as it is reflected from the target in a reverse direction through said emission spreader to impinge on said Q-spoiler, whereby light reflected from the target is caued to impinge upon the external surfaces of said Q-spoiler; and detecting means for detecting the laser emission as it is caused to be reflected from said external surfaces and for providing an output indicative of the magnitude of rotational displacement imparted to said Q-spoiler.

3. The combination of claim 2 wherein said laser rod comprises:

an elongated rod having an internally reflecting roof-top prism formed at a first end thereof and a transverse polished surface formed at the second end thereof adjacent said Q-spoiler.

4. The combination of claim 3 wherein said Q-spoiler comprises right-angle prism having a plane-surface base and a pair of plane surfaced sides forming the external surfaces of said Q-spoiler and converging to form an apex including means defining therealong a polished flat extending parallel to said base.

5. The combination of claim 4 further characterized in that said detecting means includes:

a collector system fixed adjacent the rotating Q-spoiler for intercepting the reflected emission as it reflected from the plane side surface of the right-angle prism to impinge thereon at a varying angle of incidence, dictated by the magnitude of angular displacement imparted to the right-angle prism as the Q-spoiler is rotated, and to focus said emission at a moving point traversing a plane extending parallel to the longitudinal axis of said rod;

a field stop disposed in a plane interposed between said collector system and the plane traversed by said moving point, whereby target image may be formed theron, and including a triangular slot so aligned with the path of said moving point as to be traversed by the target image along a path extending from an apex to the base of the slot as said Q-spoiler is rotated so that a quantity of reflected laser emission caused to pass through said slot will be increased as the image is caused to traverse said slot;

a right-angle prism having a first side thereof aligned in the plane traversed by said moving point; and at least a pair of light responsive detector units disposed opposite the two remaining sides of said detector prism so that as the emission is projected outwardly from said prism varying quantities of light are caused to strike each detector unit in a manner dictated by the position of the moving point, whereby angular displacement of said Q-spoiler may be determined and correlated to time for thus providing distance-to-target data.

References Cited

UNITED STATES PATENTS 3,150,363    9/1964    Finvold.

FOREIGN PATENTS 957,235    5/1964    Great Britain.

OTHER REFERENCES

Session 3: Highlights of Army Communications and Electronic R and D; MPM 3:3: new laser technique for ranging application; R. C. Benson, R. O. Godwin, and M. R. Mirarchi, U.S. Army Electronics Research and Development Laboratory, Ft. Monmouth, N.J.; NEREM Record 1962.

JEWELL H. PEDERSEN, *Primary Examiner.*

V. P. McGRAW, *Assistant Examiner.*